US012741330B2

(12) United States Patent
Minas et al.

(10) Patent No.: US 12,741,330 B2
(45) Date of Patent: Sep. 22, 2026

(54) METHOD FOR HARD FINE MACHINING OF TWO TOOTHINGS ON A WORKPIECE, AND GEAR CUTTING MACHINE, CONTROL PROGRAM, HARD FINE MACHINING COMBINATION TOOLS AND SENSOR ASSEMBLY THEREFOR

(71) Applicant: GLEASON SWITZERLAND AG, Studen (CH)

(72) Inventors: Roman Minas, Illnau (CH); Raphael Hunziker, Rothrist (CH); Severin Lang, Aefligen (CH); Marc Bürki, Langenthal (CH); Silvan Riederer, Winterthur (CH)

(73) Assignee: GLEASON-PFAUTER MASCHINENFABRIK GMBH, Ludwigsburg (DE)

(*) Notice: Subject to any disclaimer, the term of this patent is extended or adjusted under 35 U.S.C. 154(b) by 1233 days.

(21) Appl. No.: 17/597,842

(22) PCT Filed: Jul. 13, 2020

(86) PCT No.: PCT/EP2020/069772
§ 371 (c)(1),
(2) Date: Jan. 26, 2022

(87) PCT Pub. No.: WO2021/018562
PCT Pub. Date: Feb. 4, 2021

(65) Prior Publication Data

US 2022/0274193 A1 Sep. 1, 2022

(30) Foreign Application Priority Data

Jul. 31, 2019 (DE) ........................ 102019005405.9

(51) Int. Cl.
*B23F 5/16* (2006.01)
*B23F 5/02* (2006.01)
(Continued)

(52) U.S. Cl.
CPC ................ *B23F 5/163* (2013.01); *B23F 5/02* (2013.01); *B23F 17/00* (2013.01); *B23F 19/057* (2013.01);
(Continued)

(58) Field of Classification Search
CPC ...... B23F 23/12; B23F 23/1218; B23F 5/205; B23F 5/166; B23F 5/163; B23F 21/005;
(Continued)

(56) References Cited

U.S. PATENT DOCUMENTS 5,379,554 A * 1/1995 Thurman .............. B23F 21/005 451/253
5,857,896 A 1/1999 Stollberg
(Continued)

FOREIGN PATENT DOCUMENTS

DE 3314793 A1 11/1983
DE 102009059331 A1 8/2010
(Continued)

OTHER PUBLICATIONS

Machine Translation of JP 2023-510493 A, which JP '493 was published Mar. 14, 2023.*
(Continued)

*Primary Examiner* — Erica E Cadugan
(74) *Attorney, Agent, or Firm* — Robert L. McDowell

(57) ABSTRACT

A method for hard finishing two different toothings on a workpiece, wherein, prior to each machining process, to set the correct tool engagement position for the machining process, a first relative rotational angle position of a first rotational position reference of the first toothing is deter-
(Continued)

Figure 1:
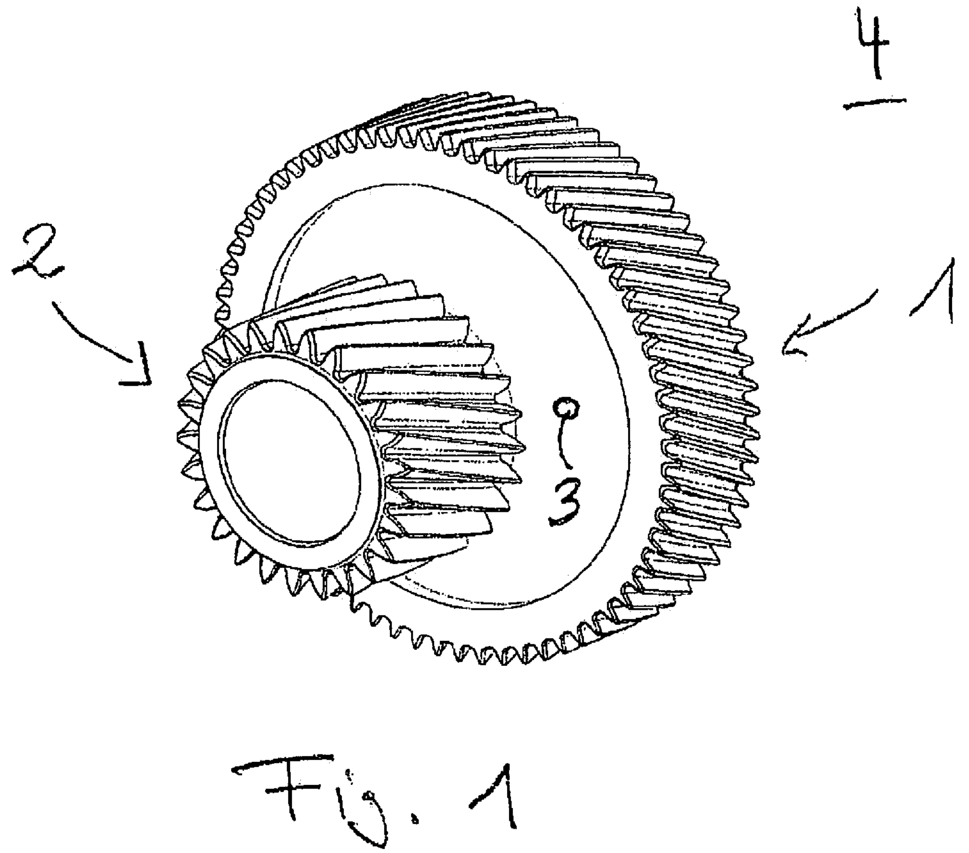

mined relative to an axial rotational position of the workpiece spindle holding and clamping the workpiece for the first machining, and a second relative rotational angle position of a second rotational position reference of the second toothing is determined relative to an axial rotational position of a workpiece spindle holding and clamping the workpiece for the second machining, wherein the machining operations are carried out on the same workpiece spindle with no intervening clamping change, and with the first and second rotational position references coupled to each other as the basis thereof.

14 Claims, 6 Drawing Sheets

(51) Int. Cl.

| | |
|---|---|
| ***B23F 17/00*** | (2006.01) |
| ***B23F 19/05*** | (2006.01) |
| ***B23F 21/03*** | (2006.01) |
| ***B23F 23/00*** | (2006.01) |
| ***B23F 23/12*** | (2006.01) |

(52) U.S. Cl.

CPC ............ *B23F 21/03* (2013.01); *B23F 23/006* (2013.01); *B23F 23/1218* (2013.01); *B23F 23/1231* (2013.01); *Y10T 409/108586* (2015.01); *Y10T 409/10954* (2015.01)

(58) Field of Classification Search

CPC ................... B23F 23/006; B23F 23/10; G05B 2219/37097

See application file for complete search history.

(56) References Cited

U.S. PATENT DOCUMENTS

| | | | | |
|---|---|---|---|---|
| 2015/0011142 | A1* | 1/2015 | Breith | B23F 21/005 451/65 |
| 2018/0236576 | A1* | 8/2018 | Tachikawa | G05B 19/402 |
| 2019/0232406 | A1* | 8/2019 | Predki | B23F 23/12 |
| 2023/0046784 | A1* | 2/2023 | Eger | B23F 23/1218 |
| 2025/0170663 | A1* | 5/2025 | Brieden | B23F 5/163 |

FOREIGN PATENT DOCUMENTS

| | | | | |
|---|---|---|---|---|
| DE | 102017006651 | A1 | | 1/2019 |
| DE | 202019001722 | U1 | | 6/2019 |
| EP | 2823924 | A2 | | 1/2015 |
| EP | 3241640 | A1 | | 11/2017 |
| GB | 2018178 | A | | 10/1979 |
| JP | 2023-510493 | A | * | 3/2023 |
| WO | 2019/011871 | A1 | | 1/2019 |

OTHER PUBLICATIONS

Screenshots from Youtube video titled “Faessler HMX 400”, posted Oct. 5, 2015, at https://www.youtube.com/watch?v=t2su-T5Xav0.*

International Search Report and Written Opinion for PCT/EP2020/069772, ISA/EPO, Sep. 30, 2020, 17 pgs.

German Patent Office Search Report for DE 102019005405.9, Jul. 31, 2020, 14 pgs.

* cited by examiner

METHOD FOR HARD FINE MACHINING OF TWO TOOTHINGS ON A WORKPIECE, AND GEAR CUTTING MACHINE, CONTROL PROGRAM, HARD FINE MACHINING COMBINATION TOOLS AND SENSOR ASSEMBLY THEREFOR

The invention relates to a method for hard finishing two different toothings on a workpiece, wherein, prior to each machining process, to set the correct tool engagement position for the machining process, a first relative rotational angle position of a first rotational position reference of the first toothing is determined relative to an axial rotational position of the workpiece spindle holding and clamping the workpiece for the first machining, and a second relative rotational angle position of a second rotational position reference of the second toothing is determined relative to an axial rotational position of a workpiece spindle holding and clamping the workpiece for the second machining.

Such methods are known, for example, for shaft-form workpieces that have two or more toothings. However, there are also "dumbbell-shaped" workpieces in which two working gears, possibly of different diameters, are connected to each other by a possibly very short shaft. For such workpieces, the gear body of one of the toothings constitutes a shoulder for the other toothing, such that the latter cannot be machined in a generating process—which would otherwise be the most precise and economical method. Such toothings are hard finished by a process in which the larger (greater diameter) toothing is hard-finished by generating grinding, whereas the smaller toothing is honed with an internally toothed honing ring, for example.

A suitable rotational position of the tool and the workpiece is required for each of the machining operations. The rotational position is typically set once for the first workpiece being machined in a workpiece batch. To this end, by way of example, a tool tooth is inserted into the tooth gap of a workpiece toothing (first centering), a contact is first made via tangential displacement or relative rotation with the left tooth flank, and then with the right tooth flank of the workpiece, the rotational positions of the contact situation are noted, and the center of the tooth gap of the workpiece toothing is calculated by averaging—as an example of a rotational position reference or the relative rotational angle position of this rotational position reference with respect to a prespecified axial rotational position of the workpiece spindle. This can also occur in a continuous process. This is the procedure in the known technique, for example for the generating grinding of the first toothing. For the further toothings of the same batch of workpieces, this initial setting operation is no longer necessary for the purpose of setting the appropriate engagement; it is sufficient to bring the subsequent workpieces into the same rotational position as the workpiece that was first machined. To this end, it is again sufficient to bring the position of the tooth gap centers (first rotational position reference) to the specified axial rotational position of the workpiece spindle (workpiece spindle reference). The positions of the tooth gaps and tooth gap centers themselves can be determined by a non-contact, inductive sensor, by way of example.

For the second toothing which will be honed, for example, the workpiece is unclamped from the workpiece spindle of the grinding machine, and is clamped on a workpiece spindle of a honing machine, and the setting (initial centering) for the tool engagement is performed for this toothing. In addition, a centering operation for the following workpieces is performed by determining the tooth gap centers (second rotational position reference) relative to the workpiece spindle reference of the honing machine.

All the known methods for machining workpieces with a plurality of different toothings have their advantages and disadvantages.

The invention is based on the object of further improving such a method, in particular with regard to high accuracy requirements.

This object is achieved by the invention, as regards the method, by a further development of a method of the type mentioned at the outset, which is substantially characterized in that the machining takes place on the same workpiece spindle, with no intervening clamping change, and with the first and second rotational position references coupled to each other as the basis thereof, wherein the manner of the machining of the hard finishing process of the first and second toothing is in particular the same, and is preferably that of a helical gear mechanism in terms of the machining engagement. The axes of rotation of the two toothings match and coincide with the workpiece spindle axis.

In the further development according to the invention, a relative rotational position of the workpiece with respect to the workpiece spindle reference, which rotational position is determined and recognized one time, is retained, because the clamping is maintained. This is normally insignificant, since the centering operation for each individual toothing is necessary anyway, and the specific tooth gap of the workpiece toothing at which the machining process is started does not matter for the specific machining operation with the hard finishing tool. However, according to the further inventive concept of the fundamental coupled first and second rotational position reference, the relevant symmetry is broken, to the extent that the relative rotational position of the first toothing with respect to the second toothing is important. If one selects any tooth gap of the first toothing, then, for example, the closest tooth gap of the other toothing in the clockwise direction has a prespecified rotational angle distance from this tooth gap of the first toothing (measured with respect to the respective tooth gap centers). In this respect, it is preferably provided that the coupling consists of a rotational angle difference between the first and second rotational position references that is within a tolerance by a prespecified rotational angle.

Since the first and second toothing are different from each other, in particular in terms of module, helix angle, tooth width and/or diameter of the toothing, such a rotational angle difference depends on which two tooth gaps, for example, adjacent in the projection plane of the workpiece axis (or at a defined space from each other) are selected. For this purpose, the first and second rotational position references are preferably assigned to a prespecified reference, in particular a selected reference tooth of a toothing. In a specific embodiment, for example, a reference tooth from the first or second toothing would be selected, the tooth gap adjoining this tooth in a clockwise direction, that is the tooth gap center thereof, would be selected as a rotational position reference and—again, viewed in projection onto the normal plane of the workpiece axis of rotation—the closest tooth gap (tooth gap center) of the other toothing would be selected. It goes without saying that tooth centers or cross combinations thereof could also be used instead of the tooth gap centers. Furthermore, it goes without saying that the assignment to the reference tooth can be designed using another tooth or tooth gap that can be determined in a defined and traceable manner using the reference tooth. For example, the first rotational position reference could also be the seventh clockwise tooth after the reference tooth, and the second rotational position reference could be the third tooth gap of the other toothing counterclockwise with respect to the reference tooth.

The axial rotational position of the workpiece spindle which is indicated by way of example (and typically) by a zero crossing during the rotation of the workpiece spindle, and is detected by a rotary encoder on the workpiece spindle, can in principle be freely selected; only the relative rotational angle position with respect to the rotational position reference on the respective workpiece toothing is important. To implement the reference and to maintain the desired angle of rotation for taking the difference in angle of rotation between the first and second rotational position reference, the absolute position of the workpiece spindle reference is not important due to the fact that a difference is taken; only its existence is important. This means that the control device of a machine performing the method knows the rotational position into which the workpiece is to be moved for the machining operation, and where the reference, for example the selected reference tooth, is located in this rotational position.

In a particularly preferred embodiment of the method, this reference, and therefore in particular the predefined selection of the reference tooth, is determined by a marking, in particular arranged on the workpiece itself. In a simplest case which can be contemplated, a marking could be provided approximately in the tooth center, with respect the angle of rotation, of a tooth of a toothing by means of a marking that can be detected by sensors—that is, in the case of optical sensors—of any character, imprint, etc., or even a simple hole, for example in the wheel body of the other, larger toothing. The latter is viewed as particularly advantageous, since it can be detected by a contactless sensor in a manner similar to that of the center sensors.

As already explained at the outset, it is also preferred in the method according to the invention to define the rotational positions for a first workpiece for the machining engagement using the given tools, and to record the rotational position references of the first and second toothing in their position relative to the workpiece spindle reference, specifically for the rotational position references defined by the reference determination explained above. This reference determination can be carried out again when the tools have been replaced or re-profiled.

This configuration is then no longer necessary for subsequent workpieces of the same batch of workpieces; rather, the appropriate axial rotational position for tool engagement can be made using the first or second relative rotational angle position determined for this workpiece, in particular by means of contactless sensors.

In this context, it is preferred if the specified reference, in particular the selected reference tooth, is also identified for each of the workpieces and, for this purpose, in particular the rotational position of the marking is detected by sensors, in particular in a contactless manner. In this way, the controller not only knows where the tooth gaps are for the first and second toothings, but also where the specific tooth gaps, for example, of the first and second toothing are located which are valid as reference for the specification of the rotational angle difference of the two rotational position references which must be observed.

In a particularly preferred embodiment, the second rotational position reference/second relative rotational angle position is determined before the machining of the first toothing is started, and vice versa. The identification of the reference and/or reference tooth is also preferably carried out before the machining of one of the toothings is started.

This means that the machine controller has information that can be used to set the appropriate rotational positions for the machining engagement. This is because there are tolerance fields for each of the individual machining operations within which the controller can select the final rotational position of the workpiece spindle for the machining operation.

Usually, a control algorithm would aim to position itself exactly in the middle of the tolerance, such that, in particular, the removal of left and right flanks is symmetrized, and even tool wear is consequently achieved. In a preferred embodiment of the method, however, a constraint is coupled into the procedure so that the rotational angle difference between the first and second rotational position reference agrees with the specification within the tolerance, and, taking this constraint into account, determines the rotational positions for the individual machining processes in their individual tolerance fields, preferably based on a symmetrization of the position in the tolerance field for both machining operations.

As a simplifying example, both individual tolerance fields have permitted values (the numerical values are only examples) between +5 μm and −5 μm (on the pitch circle), and in the ideal case the correct angle of rotation difference would also be set to 0 μm. However, due to the deformation resulting from hardening, selecting the value +2 μm for one toothing while 0 μm is maintained would symmetrize the control in a compensatory manner for the other, and would select −1 μm instead of 0 μm, and +1 μm instead of +2 μm, while observing the constraint. In this way, even with sensitive tolerances for the rotational angle difference of only a few angular minutes—for example, ±5 angular minutes or less, preferably ±2 angular minutes or less, more preferably ±1 angular minute or less, wherein it is possible to achieve ±40 angular seconds or less, in particular ±25 angular seconds or less, and even ±15 angular seconds or less—it is possible to minimize the defect quantity that can no longer meet this criterion, since both tolerance fields of the individual machining processes can be used and are known through the coupling, before the possibility of mutual coordination no longer exists due to machining of one toothing that has otherwise already been completed.

In a preferred embodiment, the hard finishing tools can be resharpened/dressed, and dressing tools are provided for this purpose, in particular in the form of the toothings, in particular diamond dressing wheels, arranged in particular on the same workpiece spindle as the first and second toothing, with a coupling of the rotational positions fixed relative to each other. Due to the rotational position coupling of the dressing tools, the relative position of their teeth is retained even after a dressing of, for example, two internally toothed honing rings. Instead of diamond dressing wheels, thin toothed dressing wheels could also be used, the engagement of which is controlled by additional axial machine movements.

As concerns the apparatus, the invention includes a tooth cutting machine for hard finishing such workpieces within the scope of protection, with the required workpiece and tool holders, rotational axes and positioning axes, and a control device with control instructions for executing a method according to one of the above aspects.

Such a tooth cutting machine preferably has two, in particular three, sensors, one each for determining the tooth gaps of the respective toothings and, in particular, the third one for detecting the position of the marking. Such a sensor arrangement with three sensors is also independently included within the scope of protection.

In addition, the tooth cutting machine can also be equipped with the resharpening or profiling devices for the hard finishing tools.

The invention also provides a hard finishing combination tool that is suitable for carrying out such a method—in the first instance, with a geometrically undefined cutting edge, preferably in the form of two internally toothed, coupled honing rings, and in another embodiment also in the form of tools with a geometrically defined cutting edge, in particular externally toothed skiving wheels.

With methods of the above aspects, it is possible to hard finish, to a satisfactory level of precision, workpieces with stepped toothings with angular synchronism, particularly for planetary gear applications, for example in e-drive transmissions.

Figure 2:
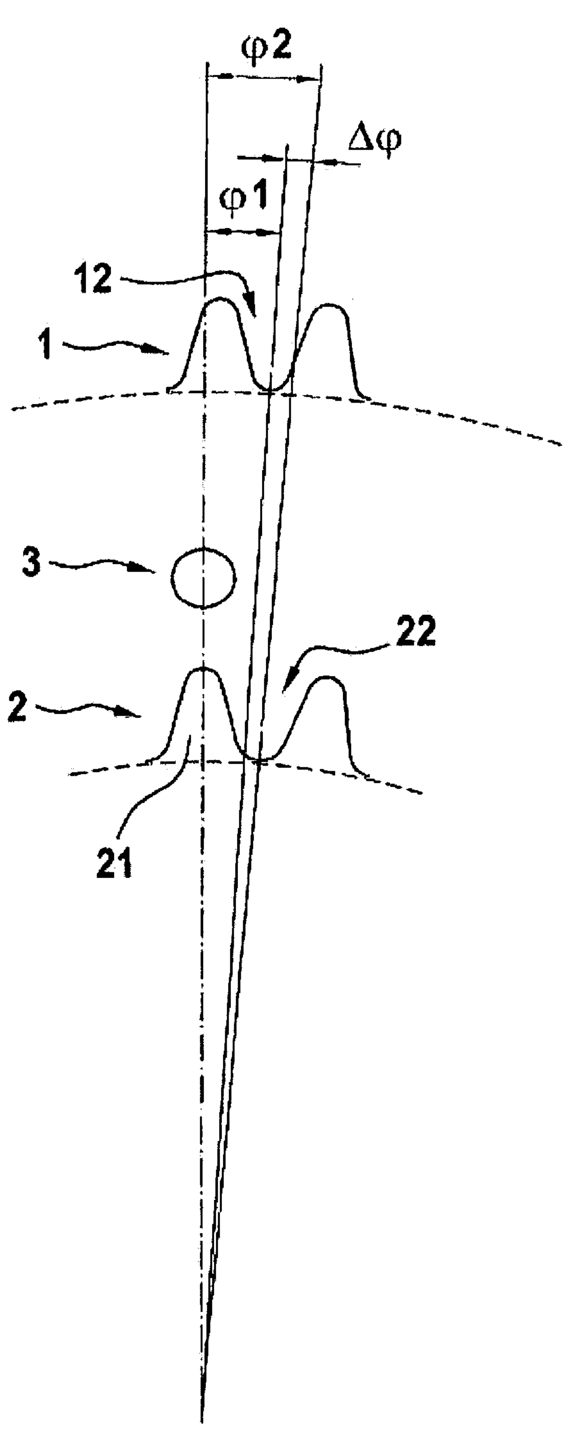
Figure 3:
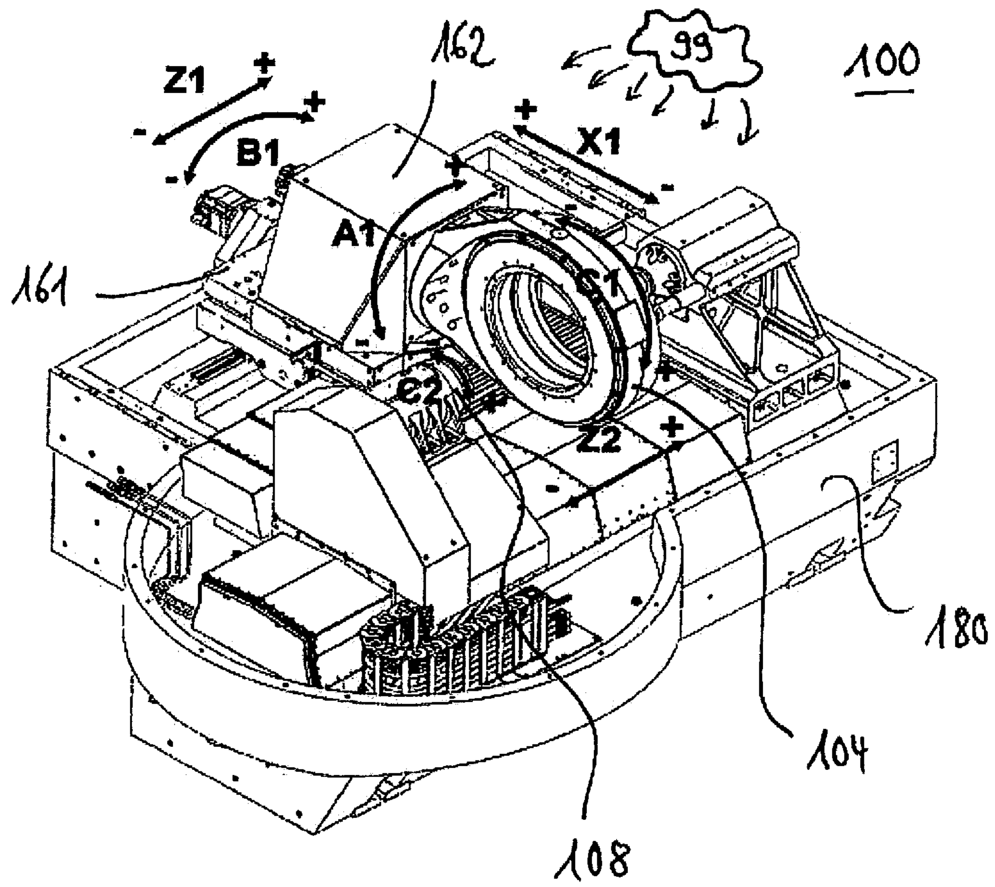
Figure 4:
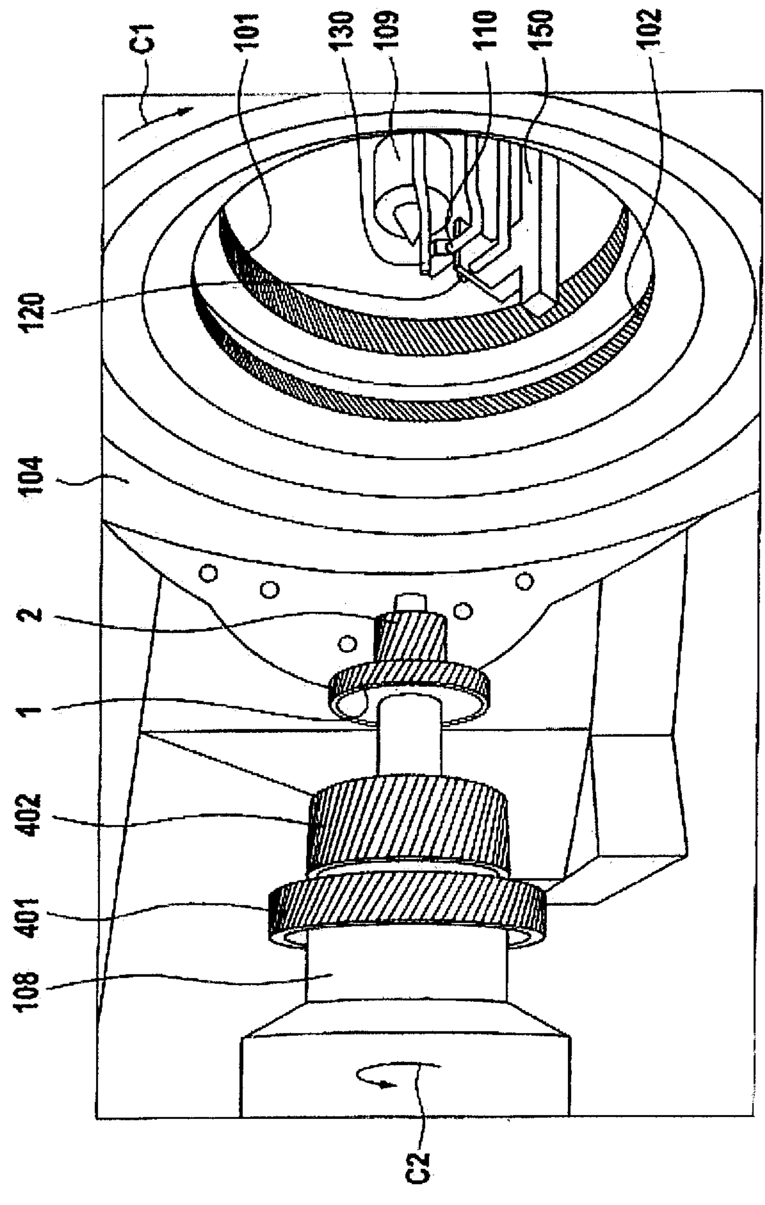
Figure 5:
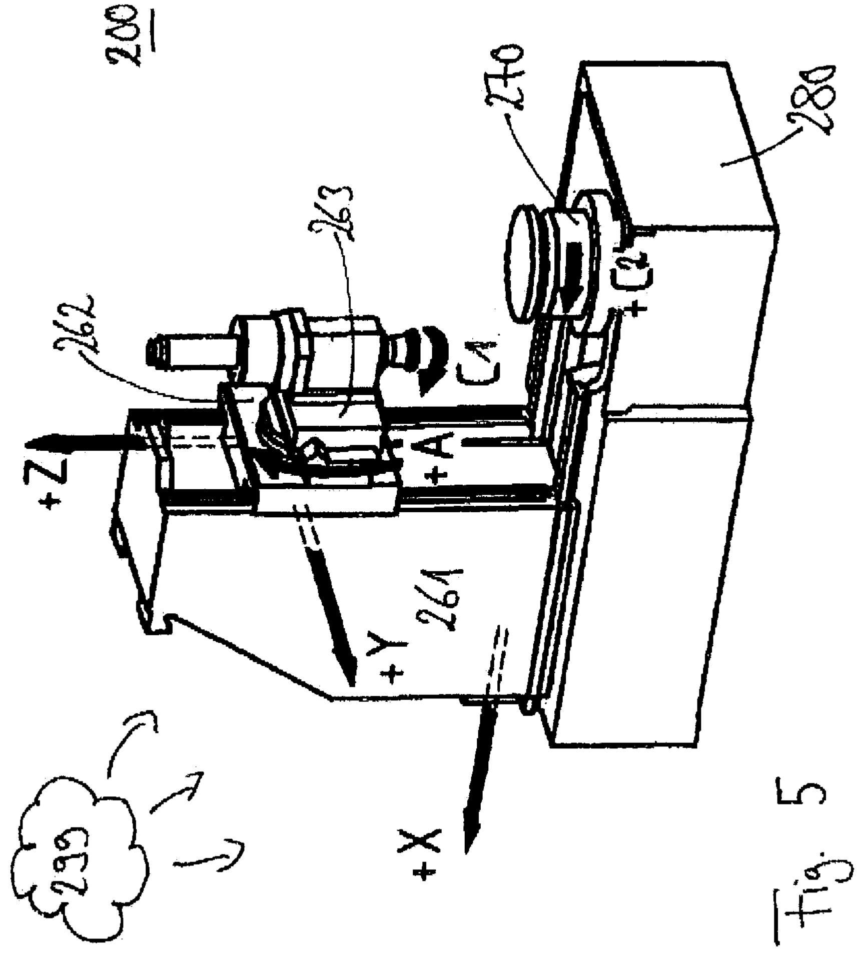
Figure 6:
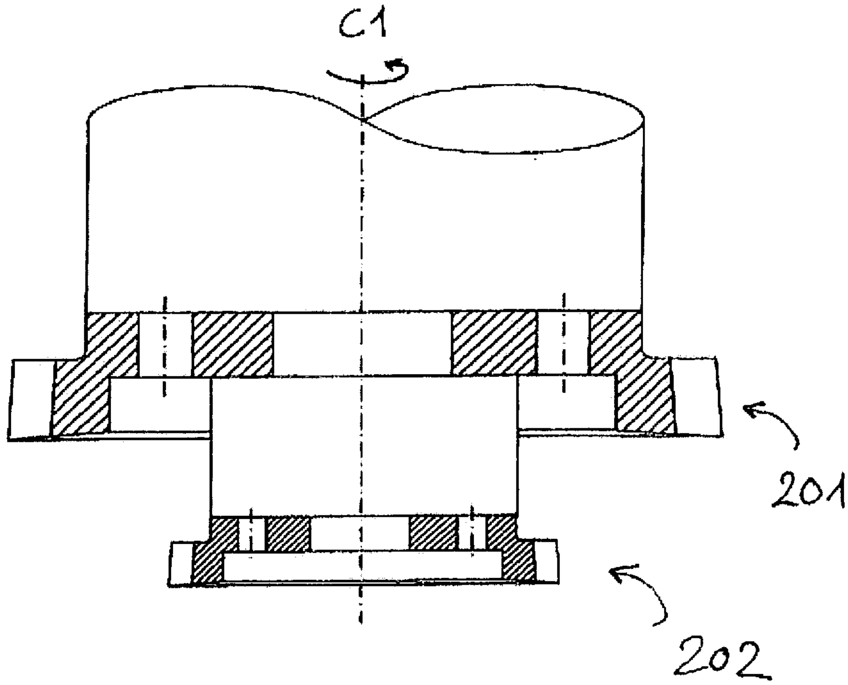

Further features, details, and advantages of the invention can be found in the following description with reference to the accompanying drawings, in which FIG. 1 is a perspective view of a workpiece with two toothings, FIG. 2 is a schematic illustration of rotational position references, in a projection plane to which the workpiece axis is perpendicular, FIG. 3 shows the structure of a honing machine with two internally toothed honing rings, FIG. 4 is a schematic illustration in which, in addition to the honing rings and the workpiece toothings, sensors and dressing tools are also shown, FIG. 5 shows a skiving machine, and FIG. 6 shows a hard finishing tool with two hard skiving wheels.

In FIG. 1, a workpiece 4 is shown in a perspective view. The workpiece 4 is roughed with two toothings, a larger (greater diameter) toothing 1 and a smaller (smaller diameter) toothing 2, which are connected to each other via a shaft and whose axes of rotation are coaxial. The two toothings also form the two axial ends of the workpiece 4. For the hard finishing process, the workpiece 4 is clamped onto a workpiece spindle, the workpiece spindle axis of which runs coaxially with the toothing axes of rotation. The toothing 1 could be produced, for example, by hobbing, and the toothing 2 by shaping or skiving; or other combinations could also have been used. The invention proceeds from the moment of hard finishing.

This means that the toothings 1 and 2 still have, with respect to their final tooth flank geometry, a machining allowance which was left when the toothings 1, 2 were created; hardening may also result in hardening deformations, and thus slightly changed tooth shapes. With the hard finishing, the remaining machining allowance, along with hardening deformation, should be removed in order to give the toothings 1, 2 their final geometry.

Also visible in FIG. 1 is a bore 3 formed in the wheel body of the toothing 1. As can be seen better from FIG. 2, the bore 3 serves as a marker for identifying a tooth 21 of the toothing 2, namely for example, a tooth 21 at a rotational position which substantially corresponds to that of the marking 3. The accuracy of the correspondence is not important. An angular offset could be provided, and the tooth of the toothing 2 next to it in the counterclockwise or clockwise direction could be marked as the tooth 21 identified by the marking 3. One could also use the marking 3 to mark a tooth gap 22 or a tooth—for example, tooth 12 of the toothing 1—or a tooth gap of the larger toothing 1.

Relative to the marking 3—in this case of the tooth center of the tooth 21 of the toothing 2 and of the tooth gap center of the next tooth gap 22—there is an angle of rotation $\varphi 2$ which, in this case, is determined on the basis of the module of the toothing 2. However, an angle value may not be known in advance if there is a different position of the marking. There is an angle $\varphi 1$ between the rotational position determined by the marking 3 (and/or its center) and the next tooth gap 12 of the toothing 1 in the clockwise direction, and a relative rotational position of the toothing 1 with respect to the toothing 2 is defined relative to the reference determined by the marking 3 by the rotational angle difference $\Delta\varphi=\varphi 2-\varphi 1$ between the two tooth gap centers 22 and 12. This angular difference Lisp should correspond to a prespecified angular difference $\Delta\varphi_0$ for the workpiece 4 within a very small tolerance $\pm\delta\Delta\varphi$ of only 5 angular minutes or less, preferably 1 angular minute or less, in particular 25 angular seconds or less.

For the following, it is assumed that not only a workpiece 4 of the type shown in FIG. 1 is to be hard finished, but also that a larger workpiece batch of these workpieces 4 is present. This batch has undergone the same production process with regard to the generation of the toothings 1, 2 and the hardening process, but may have slightly different machining allowance distributions due to the manufacturing process, or may have different hardening deformations.

The workpieces 4 of a workpiece batch are clamped for hard finishing on a workpiece spindle (with the workpiece spindle axis of rotation C2 in the embodiment of FIG. 3), and the hard finishing of the toothing 1 and of the toothing 2 is carried out without an intervening clamping change—that is, in the same clamping on the same workpiece spindle. Furthermore, the hard finishing of the toothing 1 and of the toothing 2 is carried out using the same hard finishing method, which is gear honing (shaving) with internally toothed honing rings in the example of FIG. 3, or hard skiving with externally toothed hard skiving wheels in embodiment 2 (FIG. 5). The hard finishing accordingly preferably takes place in the machining engagement of a helical gear unit with axes of rotation of the machined toothing and the machining tool that are at a cross-axis angle. As for the tool, the relative rotational positions of the two different gear cutting tools (due to the different toothings 1, 2) should also be coupled to each other in a rotationally fixed manner; this may be termed a tandem tool. The workpiece spindle reference is then a specified axis position of the C2 axis.

The explanations below are based on the embodiment according to FIGS. 3 and 4, in which the toothings 1 and 2 are honed by means of two internally toothed honing rings 101, 102 which are firmly clamped in a honing head 104.

A more detailed explanation of the tooth honing machine 100 shown in FIG. 3 is omitted, since such designs are already known to the person skilled in the art. It goes without saying that the gear honing machine has a machine bed 180 and the required carriages and machine axes in order to be able to carry out gear honing with internally toothed honing rings. In the embodiment shown in FIG. 3, the axis of rotation C1 of the honing rings 101 and 102 can be set by means of a swivel axis A1 to a cross-axis angle with respect to the workpiece spindle axis C2, which is fixed in terms of its axial position; the machine also has a further swivel angle B1 with a swivel axis which is linearly independent from the swivel axis A1, and which is preferably perpendicular to the swivel axis A1 and the axial direction of the workpiece axis C2. This in turn is parallel to a linear travel axis Z2 of the workpiece spindle. The honing head 104 is attached to a compound slide 161, 162 on the tool, which is displaceable parallel to the workpiece axis (Z1 axis) and radially to the workpiece axis Z2 (through linear axis X1). The B1 axis, which can typically be used for tooth trace modifications or influencing the same, can be used in this case as a further movement axis in order to take into account machining that is eccentric with respect to the axis intersection. Alternatively, an additional linear axis Y1, for example, orthogonal to X1 and Z1, could be provided.

The workpiece axis of rotation C2 has, as is conventional, a drive and a rotary encoder, by means of which a rotational position of the workpiece spindle (rotational axis reference) relative to a prespecified reference position, such as an internal zero crossing of the workpiece spindle, is known. The tool spindle C1 also has such a rotary encoder.

If a new workpiece is clamped onto the workpiece spindle to undergo hard finishing, the position of the tooth gaps, for example of the toothing 2, relative to the workpiece spindle reference, is usually unknown after clamping. By means of a preferably contactless sensor (index sensor), for example an inductive sensor, the positions of the tooth gaps relative to the reference of the workpiece spindle can be determined by moving the toothing 2 past the sensor 120 by a few tooth gaps. If the mutual angular position of the workpiece spindle axis and the tool axis of rotation is determined by the initial configuration of the machining engagement of the honing ring 102 with the toothing 2 for the first time (a conventional initial centering operation, for example by lowering the tool into a tooth gap, rotating it into contact with the tooth flank on the left and the tooth flank on the right of the gap while holding the rotational positions upon contact, and calculating by averaging the tooth gap center), the machine controller 99 of the tooth cutting machine 100 knows the rotational position to which the workpiece spindle is to be moved in relation to its own reference in order to be in the correct rotational position for the machining operation. These methods are already well known per se for individual toothings, and can likewise be carried out for the toothing 1 (and its machining engagement with the honing ring 101).

When machining individual gears of this type, however, it normally does not matter which tooth gap is moved into the machining position. In the present case, however, the relative rotational position of the toothing 1 with respect to the toothing 2, expressed by the rotational angle difference $\Delta\varphi$, should be adhered to within very strict tolerances, with the reference provided by the marking 3. For this purpose, a third sensor, for example also a contactless inductive sensor, is provided in this embodiment, and detects the rotational position of the marking 3 in order to form the basis for the reference for the rotational angle difference $\Delta\varphi$. In these configurations, three contactless sensors 120, 130, 110 are provided which determine the rotational positions of the tooth gaps of the toothing 2, of the marking 3, and of the tooth gaps of the toothing 1. The sensors 110, 120, 130 can be fixed in position via a common support arm 150 (as illustrated), or movably arranged via slides/movable arms and/or combinations thereof. The support arm 150 could also be retractable.

Since the honing rings 101 and 102 cannot be rotated relative to each other, and the toothing 1 cannot be rotated relative to the toothing 2, all the information is available to allow working within the individual tolerance specified for the individual machining process for the machining work on the toothing 1 by the honing wheel 101—that is, to depart from the rotational position of the tooth gap centers in relation to the workpiece spindle reference in comparison to that of the "master wheel" from the initial setup, for the machining rotational position within the individual tolerances relative to the master wheel—and in this way to ensure that there is in any case enough removable allowance relative to the final tooth flank geometry (such that movements are made proceeding from the manufacturing tolerances of the toothing 1 itself). The same must be done for the toothing 2, and both configurations should preferably be coordinated with each other in advance in such a manner that the rotational position difference $\Delta\varphi$ lies within the specified tolerance $\delta\Delta\varphi$.

The effects are discussed below using an example that is greatly simplified for explanatory purposes. It goes without saying that the settings for the "master wheel"—that is, a workpiece to be machined first in the workpiece batch and/or the first workpiece of the resumed machining, are configured after re-profiling the honing rings 101, 102 to the appropriate rotational engagement positions while maintaining the angular difference $\Delta\varphi$. If one exaggeratedly assumes that the hardening of the toothing 2 caused a deformation with a tendency to shift the tooth gap centers clockwise, and, for toothing 1, counterclockwise, the controller would make a correction by comparing the relative rotational positions of the first rotational position reference of the toothing 1 to the reference of the workpiece spindle relative to that of the master wheel to determine the appropriate rotational position setting for machining relative to that of the master wheel, ideally to be in the center of the tolerance field for the toothing 1, and, for example, to move $-|\delta\varphi\mathbf{1}|$; and, with the same approach, to move+1421 for the toothing 2. However, there would then be a difference for this workpiece in the angle of rotation of the toothing 2 relative to toothing 1 of $\Delta\varphi^*=\varphi\mathbf{2}+|\delta\varphi\mathbf{2}|-(\varphi\mathbf{1}-|\delta\varphi\mathbf{1}|)=\Delta\varphi+(|\delta\varphi\mathbf{1}|+|\delta\varphi\mathbf{2}|)$, and, where $|\delta\varphi\mathbf{2}|+|\delta\varphi\mathbf{1}|>\delta\Delta\varphi$, this would lead to a workpiece that no longer meets the requirements.

The coupling of the rotational position references of the toothing 1 and the toothing 2 (with reference to the constellation identified by the marking 3, or otherwise identified) ensures that $\Delta\varphi^*$ (if theoretically still possible) is always within the tolerance of $\Delta\varphi_0$, and, in addition, the respective individual tolerances are still observed—however, the optimal center of the tolerance field of the individual tolerances of the individual toothings 1, 2, are no longer observed for the individual machining processes of the toothings 1, 2.

In the conventional provision of such workpieces 4, in which a first toothing is machined by grinding and, after changing the clamping, the other toothing is machined by, for example, honing, or the opposite sequence is used, hard finishing has already taken place and, ignoring the non-implemented identical workpiece clamping, there is no longer any leeway with regard to the tolerance field that could be used to ensure the rotational position difference $\Delta\varphi$ lies within the tolerance.

In the schematic illustration of FIG. 4, the rotational position-coupled honing wheels 101 and 102 in the honing head 104, and the sensors 110, 120 and 130, are shown again. A tailstock center 109 and diamond dressing wheels 401, 402 are also provided on the workpiece spindle 108 for dressing the honing rings 101, 102.

It goes without saying that the type of marking 3 as a hole in the disk body of the toothing 1, and the sensor-based detection of its rotational position, is only one of several options for determining the reference for the application of the specified rotational angle difference $\Delta\varphi$ (if one considers the rotational angle difference between two tooth gaps of the toothing 1 and 2 adjacent in the projection plane at any other point, as a rule this will differ significantly from $\Delta\varphi_0$ due to the different toothing, so the reference determination is favorable in itself).

For example, one could also think of using the above-described detection of the rotational positions of the tooth gaps of the toothing 1 to reference the workpiece spindle, and of the tooth gaps of the toothing 2 to reference the workpiece spindle, to identify a characteristic pairing of two teeth or tooth gaps of the toothing 1 and toothing 2 which occurs only once, and for this characteristic pairing to determine the angular position difference Δφ' and to introduce it as a constraint for the setting of the rotational positions for the respective machining operations.

A second embodiment is shown in FIGS. 5 and 6. The hard skiving machine 200 shown in FIG. 5 has a machine bed 280, on one side of which a workpiece table with a workpiece spindle 270 is arranged. The latter can be equipped with an adapter clamp (not shown) for receiving the workpiece 4 shown in FIG. 1. A tailstock arrangement for the counter mounting point is not shown (similar to the tailstock center 109 of FIG. 4).

On the tool, a main stand 261 is provided which can be moved along a radial direction X, and on which a vertical carriage 262 can be moved in the Z direction parallel to the workpiece axis. It carries a tangential carriage 263 (Y direction in the rotational position A shown) which is rotatable with the axis of rotation A for setting a cross-axis angle. The hard skiving head is attached to the tangential carriage 263. In FIG. 5, the machine is shown with only one single tool with a hard skiving wheel; however the tandem tool shown in FIG. 6 is preferably used. The machine 200 and its axial machine movements are controlled by a controller 299.

In this case, the hard finishing is carried out on a hard skiving machine, with the structure of the combination tool, shown only roughly schematically in FIG. 6, consisting of two hard skiving wheels 201 and 202 for hard skiving the toothings 1 and 2. The approach to the determination of the rotational position is as described with reference to the first embodiment; however, the type of hard finishing changes due to machining with a geometrically defined cutting edge. In this case as well, the two hard skiving wheels 201, 202 are rotationally coupled, and the relative rotational position settings of the two hard skiving wheels that are the same on the tool therefore prevail for all workpieces 4 of the batch. In this case as well, although it is not shown, preferably three sensors are provided, for example attached to the tool head via a support structure, for detecting the rotational positions of the first and second rotational position reference, and of the reference (the marking 3).

However, internally toothed skiving rings—that is, tools which are similar in shape to the honing rings 101, 102, but with a geometrically defined cutting edge—could also be used. Toothing honing with externally toothed wheels, similar to the form of the hard skiving wheels 201, 202 but with a geometrically undefined cutting edge, is also conceivable.

As can be seen, the invention is not restricted to the details shown in the above embodiments. Rather, the individual features of the following claims and of the above description and the following claims may be essential, individually and in combination, for implementing the invention in its different embodiments.

The invention claimed is:

1. A method for hard finishing two different gears (1, 2) provided on a workpiece (4), said gears each having respective teeth, wherein said gears each have a respective tooth gap being defined by the space between successive ones of the teeth on each of said gears, said workpiece being removably held on a rotatable workpiece spindle of a gear hard finishing machine during the hard finishing, wherein said workpiece spindle is rotatable about a workpiece spindle axis, and wherein said two different gears comprise a first gear (1) and a second gear (2), and wherein said hard finishing of said first gear (1) is carried out by a first machining process by a first hard finishing tool and said hard finishing of said second gear (2) is carried out by a second machining process by a second hard finishing tool, wherein, prior to each of said first and second machining process, to enable tool engagement of said first hard finishing tool with said first gear and engagement of said second hard finishing tool with said second gear for carrying out the respective machining process, a first relative rotational angle position (φ1) of a first rotational position reference (12) of the first gear (1) is detected relative to a position of a marking (3) on said workpiece (4) and relative to a position of said workpiece spindle about the rotational axis of the workpiece spindle, and a second relative rotational angle position (φ2) of a second rotational position reference (22) of the second gear is detected relative to a position of said workpiece spindle about the rotational axis of the workpiece spindle, wherein the first relative rotational angle position (φ1) of the first rotational position reference (12) of the first gear (1) is different from the second relative rotational angle position (φ2) of a second rotational position reference (22) of the second gear (2), wherein the first and second machining processes are carried out on the first (1) and second (2) gears, respectively, while the first (1) and second (2) gears are held on said workpiece spindle of said gear hard finishing machine, with no workpiece holding change occurring between said first and second machining processes, and with the difference between the first and second rotational position references defining a relative rotational position of the first gear with respect to a rotational position of the second gear for the first and second machining processes.

2. The method according to claim 1, wherein the difference between the first and second rotational position references consists of a rotational angle difference (Δφ) between the first and second rotational position references, said rotational angle difference being within a tolerance (±δΔφ) with respect to a prespecified rotational angle ($\Delta\varphi_0$).

3. The method according to claim 1 wherein the first and second rotational position references are determined with respect to a reference tooth of said first gear or said second gear.

4. The method according to claim 3, wherein the reference tooth is determined with respect to the marking (3).

5. The method according to claim 4 wherein a rotational position of the marking about the workpiece spindle axis is detected by a sensor in a contactless manner.

6. The method according to claim 1 wherein said workpiece is a first workpiece of a batch of identical workpieces to be hard finished, and the first (φ1) and/or second (φ2) relative rotational angle position is/are determined via sensor-detected contact between the respective first and/or second workpiece gears and the respective first and/or second hard finishing tool.

7. The method according to claim 6, wherein for workpieces following said first workpiece of a batch of identical workpieces to be hard finished, said following workpieces are each held by the workpiece spindle for engagement by the first and second hard finishing tool, respectively, a rotational position of the workpiece spindle being determined by means of a contactless sensor.

8. The method according to claim 1 wherein the detection of the second relative rotational angle position is carried out before the first machining process of the first gear is started.

9. The method according to claim 1 wherein first and second dressing tools (401, 402) for dressing the first and second hard finishing tools (101, 102) are arranged at respective rotational positions with the rotational positions of the first and second dressing tools being fixed relative to each other, said first and second dressing tools each being a respective diamond dressing wheel in the form of a respective toothed gear and each of the first and second dressing tools being arranged on the same workpiece spindle (108) as said first and second gears (1, 2) of said workpiece.

10. The method of claim 1 including a sensor arrangement for an operation related to the tooth gaps of the workpiece (4), said sensor arrangement having a first contactless sensor (110) for detecting the tooth gap of the first gear, a second contactless sensor (120) for detecting the tooth gap of the second gear, and a third sensor (130) for detecting the marking (3) on the workpiece (4), said marking being a reference for determining the difference between the first and second rotational position references of the first and second gears, respectively.

11. The method according to claim 10, wherein the first contactless sensor, the second contactless sensor, and the third sensor are arranged on a common support arm.

12. The method according to claim 11 wherein the support arm is retractable.

13. The method according to claim 1 wherein when said workpiece is a first workpiece to be hard finished after a replacement or resharpening and/or profiling of at least one of the first and/or second hard finishing tools, the first and/or second relative rotational angle position is/are determined via sensor-detected contact between the respective first and/or second workpiece toothing and the respective first and/or second hard finishing tool.

14. The method according to claim 13 wherein for workpieces following said first workpiece to be hard finished after a replacement or resharpening and/or profiling of at least one of the first and/or second hard finishing tools, the following workpieces are each held by the workpiece spindle for engagement by the first and second hard finishing tool, respectively, a rotational position of the workpiece spindle being determined by means of a contactless sensor.

* * * * *